H. H. HOWELL.
CULTIVATOR.
APPLICATION FILED SEPT. 19, 1919.
1,358,743.
Patented Nov. 16, 1920.
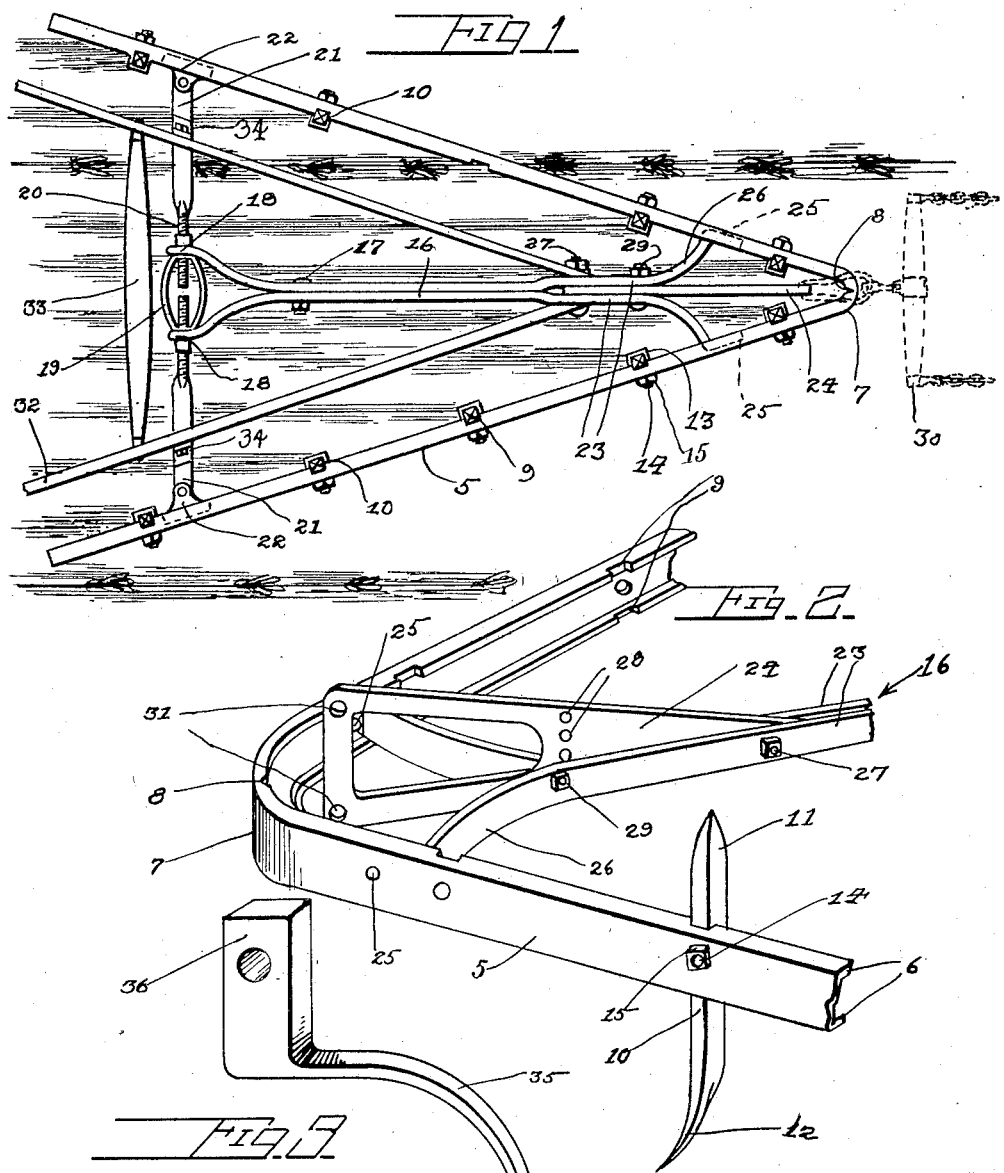
Witness
F. B. Wooden.
Inventor
Harry H. Howell
By C. A. Snow & Co.
Attorneys

UNITED STATES PATENT OFFICE.

HARRY H. HOWELL, OF HOPE, ARKANSAS.

CULTIVATOR.

1,358,743.   Specification of Letters Patent.   Patented Nov. 16, 1920.

Application filed September 19, 1919. Serial No. 324,848.

*To all whom it may concern:*

Be it known that I, HARRY H. HOWELL, a citizen of the United States, residing at Hope, in the county of Hempstead and State of Arkansas, have invented a new and useful Cultivator, of which the following is a specification.

This invention relates to the class of agricultural implements and more particularly to an improved cultivator of the type employing a substantially A-shaped or V-shaped frame designed to carry a plurality of cultivators or harrow teeth principally intended for the purpose of cultivating the ground around and along rows of growing plants during the early stages of their growth.

Among the principal objects of the invention are to provide an improved frame construction whereby the width thereof may be adjusted to cause the sides of the frame to be spread apart or drawn together, thereby enabling the farmer to adapt the implement to any width of row; to provide improved means for adjusting the frame; to provide an improved construction of frame whereby the latter can be made from a single section of channel steel; to provide improved draft means for regulating the depth of action of the cultivator teeth in the ground and to permit the cultivator to be reversed for use of different types of teeth or when worn on one side; to provide novel attaching means for permitting adjustment of the teeth at different angles; and to provide improved handle attaching means and to generally simplify and reduce the number of parts required in the construction thereof.

With the above objects and others in view, as will appear as the description proceeds, the invention comprises certain novel combinations and arrangements of parts as will be hereinafter more particularly pointed out in the claims.

In the accompanying drawings:

Figure 1 is a plan view of my improved reversible toothed cultivator,

Fig. 2 is a fragmentary perspective view of the nose end of the frame of the cultivator showing the draft attaching means and method of supporting the cultivator teeth, and Fig. 3 is a perspective view showing a modified form of tooth.

Referring to the drawings in which corresponding reference characters designate like parts, the numeral 5 designates the frame of the cultivator, which is of substantially A-shaped or V-shaped formation and comprises a single section or length of channel metal bent intermediately of its ends with the flanges of the channel extending inwardly as indicated at 6 and so as to provide at the nose portion 7, a V-shaped cut 8 permitting the sides of the frame to be spread apart or drawn together so that the width of the frame may be adjusted to accommodate or adapt the tool to rows of different widths.

At spaced points equidistantly along the sides or bars of the frame, the flanges thereof are provided with vertically alined recesses 9 adapted to receive the shank portions of the teeth 10, said teeth having straight pointed ends 11 which may be used for harrowing if desired, and cultivator points 12. The teeth are engaged through rectangular socketed sleeves 13 constituting the heads or studs of bolts 14 engaging apertures alining vertically with the recesses 9 but disposed through the web portions of the sides and removably secured in position by suitable retaining means such as nuts 15. The teeth can be vertically adjusted and clamped in position or by slacking off the nuts to permit the teeth to be disengaged from the recess, the teeth may all be slanted to any desired angle against the edges of the flanges of the frame sides and the nuts tightened to hold them in that position. It will also be seen that when the tool is in action, the pressure on the teeth comes diagonally across the side or bar of the frame, thereby creating a friction at that point between the two fastening means and the frame, thereby enabling the teeth to remain at any desired angle, whereas if the side members of the frame traveled end on or in the direction of their length, that is straight with the row, there would be danger of the teeth not remaining in fixed position when coming in contact with obstructions.

Extending longitudinally and bisecting the frame is a draft bar 16 comprising spaced sections disposed in contact for the greater portion of their lengths and riveted together as shown at 17 where their rear ends branch apart or diverge to form spaced apertured portions or eyes 18 for rotatably receiving a turn buckle nut 19. This nut is engaged with oppositely threaded stems 20 formed at the inner ends of flat braces 21 horizontally disposed and pivoted at their outer ends to ears 22 riveted or otherwise attached to the sides of the frame near their rear ends.

The forward ends of the bars or sections are disposed in spaced relation as indicated at 23 to receive therein a draft clevis 24. Said forward ends are curved outwardly and formed with attaching portions riveted or otherwise secured to the sides of the frame as indicated at 25, said outwardly curved portions being designated at 26. The clevis 24 is pivotally mounted between the sections 23 as indicated at 27 so as to be capable of vertical adjustment through the medium of a vertical series of apertures 28 which may be individually engaged by a securing bolt or the like 29, which bolt also passes through the spaced portions or sections of the draft bar. The draft attaching means designated at 30 may be connected with the clevis through either one of a pair of apertures 31 and it will also be obvious that by removing the bolt 29, the clevis may be disposed to project from either side of the frame so that the latter may be reversed or turned over to use either type of teeth points.

Also, it will be seen that by adjusting the turn buckle, the sides of the frame may be separated or spread apart, or drawn together to vary the width thereof and in Fig. 1 of the drawings the device is shown adjusted and with one tooth removed to straddle a row in a young crop so that both sides may be worked in one trip across a field, although it is obvious that a tooth may be removed from either or both sides when the device is used as a cultivator or harrow.

The handles are designated at 32 and at their forward ends are connected to the retaining bolt 27 and near their rear ends by a cross brace 33. Braces 34 connect the handles to the braces or bars 21, being bolted thereto so as to permit the handle to be reversed in position with the harrow frame and teeth quickly and readily. In Fig. 3 of the drawings a spring tooth 35 of curved formation is shown having a shank 36 designed for attachment in the same manner as the teeth 10 and by the means already described. The adjustment of the frame by using the spring-steel center-bar may be accomplished in such a way as to relieve the strain on the nose of the frame, and in actual tests after 12,000 adjustments, the metal did not show the least sign of fracture. Also, by securing the draft bar at a point of about one third of the distance back toward the center of the frame, an even pressure is caused to be exerted by the teeth on the ground over the entire surface of the cultivator.

It will also be apparent that by removing but two bolts securing the handle braces in position to the rear cross bar, and the bolt that secures the lower ends of the handles to the frame, and forward bolt of the draft bar and clevis, the implement can be used on the reversed side and practically produces two complete implements. In addition, the number of fastening bolts and rivets is considerably reduced as compared to the number required in connection with prior constructions. In lieu of the turn buckle, any suitable means may be provided for adjusting the width of the frame through the medium of the cross bar, such means consisting of a hand wheel, ratchet lever or otherwise of well known construction and operation as employed in connection with various of the arts.

What is claimed is:—

1. In a cultivator, a single section of channel metal rebent and provided with a V-cut at the inside of the nose thereof adapting said sides of the frame to be adjusted laterally to regulate the width of the frame, and means for connecting and holding said sides in adjusted relation.

2. A cultivator comprising a substantially V-shaped frame, said frame comprising a section of metal rebent to provide side portions, said frame at the point of bend being provided with a notch, said sides being adapted for relative movement toward and away from each other, and means connecting said side portions to brace the same, adjust the same relatively and hold the same in adjusted relation, said frame being arranged for the attachment of ground engaging teeth.

3. In a cultivator of the type having a substantially A-shaped frame, said frame comprising side portions, connecting means between said side portions for adjusting the same toward and away from each other, a central draft bar for the frame and connected to said sides near their forward ends, and a clevis connected to said bar.

4. In a cultivator, a single section of channel metal rebent and provided with a V-cut at the inside of the nose thereof adapting said sides of the frame to be adjusted laterally to regulate the width of the frame, a cross brace connecting said sides and including means for adjusting the length thereof, and teeth carried by said frame.

5. A cultivator comprising a V-shaped frame, a cross member connecting the sides thereof, a central draft bar connected to the cross member and the frame sides, handles connected to said bar and cross member, and a draft attaching clevis pivoted to the bar to be held at either side of the frame and bar.

6. A cultivator comprising a frame of V shape, a draft bar longitudinally of the frame and comprising a pair of connected sections having apertured ends, a cross member engaged therethrough and to the sides of the frame, the forward ends of the sections being spaced apart and connected to the sides of the frame, a clevis pivoted between said spaced portions at a spaced distance from the nose of the frame, means to adjust the clevis vertically to project above or below the frame, means for securing a draft means thereto, a handle connected to the cross member and bar and means for reversing the handle.

7. A cultivator comprising a frame of V shape, teeth carried by the frame, a bar longitudinally of the frame and comprising a pair of connected sections having apertured ends, a cross member engaged therethrough and to the sides of the frame, the forward ends of the sections being connected to the sides of the frame, a bar fixed between the forward portions of the sections of the first named bar and extending forwardly toward the bight portion of the frame and adapted for connection with draft means, and a handle connected to the first named bar and cross member.

In testimony that I claim the foregoing as my own, I have hereto affixed my signature in the presence of two witnesses.

HARRY H. HOWELL.

Witnesses:
ROY ANDERSON,
SYD MCMATH.